United States Patent Office 3,156,978
Patented Nov. 17, 1964

3,156,978
JOINING TITANIUM AND TITANIUM-BASE
ALLOYS TO HIGH MELTING METALS
Dean K. Hanink, Indianapolis, Ind., and James C. Holzwarth, Birmingham, Mich., assignors to General Motors Corporation, Detroit, Mich., a corporation of Delaware
No Drawing. Original application Feb. 16, 1953, Ser. No. 337,214, now Patent No. 3,010,198, dated Nov. 28, 1961. Divided and this application Mar. 27, 1961, Ser. No. 98,332
4 Claims. (Cl. 29—495)

This invention relates to the joining of titanium or titanium-base alloy parts to metals having high melting points. More particularly, this invention has to do with coating and brazing together a plurality of titanium or titanium-base alloy parts with aluminum or an aluminum-base alloy to form a unitary structure.

This application is a division of United States patent application Serial No. 337,214, filed February 16, 1953.

A principal object of our invention is to provide an inexpensive method of securely joining a titanium or titanium-base alloy part to another titanium-base part or to other high melting point metals, such as steel, by a brazing operation. In accordance with the invention this is accomplished in a manner which is practical and economically advantageous over methods of joining titanium parts heretofore proposed. Among other advantages of our invention, our process has the advantage that loosely fitted parts having relatively large interjacent gaps can be readily bonded and sealed. Inasmuch as the resultant bonded assembly is coated with aluminum, it has the corrosion resistance and appearance of aluminum and the heat resistance of aluminum-coated titanium.

The uses for which our invention is particularly adapted include aluminum brazing of titanium parts, such as the joining of aircraft propeller blade halves by aluminum brazing and the brazing of turbine compressor blades to the compressor hub. These parts may be aluminum coated and aluminum brazed to aluminum in accordance with our invention to join the parts together. Aluminum bearings having titanium-base alloy backings likewise may be satisfactorily formed by this method. The titanium backing is first coated with aluminum or an aluminum alloy and the aluminum bearing brazed to the aluminum coating by the process hereinafter described. A sound joint is provided because the metal interface layer is not brittle, as would be the case if the titanium backing were not first coated with aluminum, as hereinafter explained.

Other objects and advantages of our invention will more fully appear from the following detailed description of a preferred process for brazing titanium or titanium-base alloy parts to other titanium parts or to other high melting materials.

It will be understood that by "aluminum-base alloy," as hereinafter used, it is meant those aluminum alloys, including pure aluminum, which in general contain at least 80% aluminum. Hence, it will also be understood that the terms "aluminum" and "aluminum-base alloy," as used herein, are interchangeable and are not intended to restrict any phases of the invention to only one of these groups. Similarly, the terminology "titanium-base alloy" or "titanium-base metal" is meant to include pure titanium and all alloys thereof in which titanium constitutes at least 50% of the alloy.

Titanium-base alloys which may be brazed in accordance with our invention include the commercially available alloys containing appreciable amounts of chromium. Typical examples of these alloys are those having the following compositions:

| | Percent |
|---|---|
| Chromium | 3.00 |
| Iron | 1.50 |
| Oxygen | 0.50 |
| Nitrogen | 0.04 |
| Tungsten | maximum 0.08 |
| Carbon | 0.02 |

Balance substantially all titanium.

| | Percent |
|---|---|
| Chromium | 2.70 |
| Iron | 1.30 |
| Oxygen | 0.25 |
| Nitrogen | 0.02 |
| Carbon | 0.02 |
| Tungsten | maximum 0.04 |

Balance substantially all titanium.

Likewise, as hereinbefore indicated, our process is adapted for use in coating pure or "commercially pure" titanium with aluminum or an aluminum-base alloy. A typical example of this latter type of titanium alloy is one consisting essentially of 0.10% iron, 0.02% nitrogen, carbon not in excess of 0.04%, tungsten not in excess of 0.04%, traces of oxygen, and the balance substantially all titanium.

In carrying out our invention, the titanium or titanium-base alloy parts are immersed in a molten or fused salt bath capable of absorbing oxides of aluminum and titanium or other high melting metal to be joined. We have found that a highly satisfactory salt bath is one comprising, by weight, 37% to 57% potassium chloride, 25% to 45% sodium chloride, 8% to 20% cryolite ($Na_3AlF_6$), and 0.5% to 12% aluminum fluoride. A bath consisting essentially of 47% by weight of potassium chloride, 35% by weight of sodium chloride, 12% by weight of cryolite, and 6% by weight of aluminum fluoride is a specific example of this salt bath which provides excellent results.

While in the foregoing examples the double salt $$Na_3AlF_6$$

(cryolite) is included in the bath, it should be understood that an equivalent amount of this component may be supplied in the form of the single salts, sodium fluoride and aluminum fluoride. However, we have found that it is essential to provide an excess of $AlF_3$ over that of the cryolite ratio in order to obtain the desired results.

The salt bath composition usually preferred is one which will become molten when heated to a temperature of approximately 1200° F. or somewhat lower. The above specific salt bath has a melting point of approximately 1180° F. and, if desired, a small amount of lithium chloride may be added to the salt to lower the melting point thereof. For example, the addition of about 20% lithium chloride lowers the melting point of this composition to approximately 1075° F. During operation of the process the temperature of the fused salt bath is maintained somewhat above the melting point of the aluminum or aluminum-base alloy, a temperature above approximately 1250° F. being desirable to obtain effective fluxing action. To avoid excessive volatilization and chemical instability of the molten salt, however, it should not be maintained higher than approximately 1600° F. In general, a salt bath temperature within the range between 1300° F. and 1450° F. is preferred.

The surfaces of the titanium-base alloy parts are preferably cleaned in any suitable manner prior to the immersion in the fused salt bath. Where the titanium-base alloys have an excessive amount of oil thereon or are badly scaled, more consistent and uniform results may be obtained if mechanical cleaning means, such as grit blasting, sand blasting, hydroblasting or vapor blasting, is employed. Other suitable cleaning treatments, such as etching by appropriate fluxes, may be used if desired. This preliminary cleaning treatment, although recommended as a preferred step in the procedure, is not necessary in order to obtain satisfactory results in most instances. Frequently no special preparation of the surface of the titanium base alloy parts prior to immersion in the fused salt bath is required since the molten salt bath flux dissolves titanium oxides, and a small amount of oil will burn off with no deleterious effects. The titanium alloy parts, of course, must be dry to avoid a steam explosion when immersed in the molten salt.

The fused salt bath must be activated by aluminum in or in contact with it in order to provide effective fluxing action. This may be accomplished by employing an aluminum or aluminum alloy coated container for the fused salt, or aluminum or an aluminum alloy may be added to the salt. The aluminum or aluminum alloy may be added by immersing a bar or sheet of the metal in the fused salt bath. This bar or sheet of aluminum or aluminum alloy readily melts and settles to the bottom of the bath.

After treatment in the fused salt bath, which serves to clean undesirable oxides from the titanium or titanium-base alloys and to flux the metal, the titanium-base alloy parts are immersed in molten aluminum or molten aluminum-base alloy to form a coating of aluminum or aluminum alloy thereon. In accordance with our invention, the preferred procedure is to pass unheated titanium-base metal parts directly through a relatively thin layer of the fused salt which is floating on a molten aluminum or aluminum base alloy coating bath. The cold titanium-base metal parts, in passing through the layer of activated salt flux, will become coated with a layer of the flux which may solidifiy, but which will remelt after sufficient time of contact with the molten aluminum or aluminum alloy bath underneath the fused salt layer. An adherent coating of aluminum on the titanium-base metal parts may be obtained by this procedure because the aluminum contacts the titanium alloys immediately after the salt is removed from the surface, and there is no opportunity for titanium oxides to form.

After passing through the fused salt flux and into the molten aluminum or aluminum-base alloy bath, the titanium or titanium-base alloy parts are permitted to remain in the coating bath until at least their surfaces reach the melting point of the coating metal. The time may vary from as little as about one or two seconds up to several minutes, depending somewhat on the exact procedure used, as will be hereinafter fully explained, and the degree of complication of recesses, etc., in the parts being processed.

The molten metal coating bath may be pure aluminum or an aluminum-base alloy and, as hereinbefore indicated, this alloy preferably should contain approximately 80% or more aluminum. An aluminum-base alloy which is particularly advantageous is one composed of approximately 5% to 15% silicon and the balance aluminum. This alloy has a relatively low melting temperature, i.e., eutectic at 12% silicon, and has high fluidity, both of these properties being highly advantageous in forming relatively nonbrittle coatings. Effective drainage of excess coating metal is obtained because of the high fluidity. Specific examples of other appropriate aluminum-base alloys include an alloy composed of 4% copper and the balance aluminum, an alloy composed of approximately 7% tin or 7% silicon and 93% aluminum, and an alloy containing 5% to 20% zinc and the balance substantially all aluminum. These specific examples are referred to merely for purposes of illustration and not of limitation.

Best results are obtained when the coating metal bath is maintained at substantially the same temperature as that of the fused salt bath. At present it is preferred that the temperature of the aluminum or aluminum-base alloy coating bath be maintained at a temperature between about 1250° F. and 1325° F. Temperatures as low as approximately 1150° F. are suitable, however, for the aluminum-base alloys. Pure aluminum melts at approximately 1218° F., and consequently, when employing pure aluminum as the coating metal, aluminum and salt bath temperatures of at least 1218° F. must be used. The upper temperature employed with either aluminum-base alloys or pure aluminum as the coating metal is approximately 1600° F. A single heating means may be employed, of course, for both the fused salt and molten aluminum baths if they are used in the same container, as hereinbefore described.

After reaching the proper temperature in the coating bath, the aluminum-coated titanium parts are withdrawn from the coating bath through the molten salt layer. At times there may be a tendency to form a thicker or heavier coating of aluminum or aluminum alloy than desired. Excess molten coating material can be drained off by passing the coated titanium-base alloy parts slowly through the molten salt during removal from the baths. Alternatively, this draining of excess coating metal may be accomplished by holding the coated parts in the fused salt for a short period of time after they have been withdrawn from the coating bath. The coated titanium-base alloy parts, after removal, or as they are being removed from the aluminum or aluminum alloy bath, also may be rapidly vibrated or rotated or treated in other equivalent manner in order to remove excess molten or mushy coating metal. Similarly, the coated surfaces of the parts may be air blasted to remove any excess coating metal with out detriment to the aluminum coating.

The aluminum coating on the titanium or titanium base alloy parts is then preferably allowed to solidify and the coated parts cooled or permitted to cool. Water or other quenching media may be employed for this purpose. Excess flux may be removed by washing, for example, or the coated titanium base metal parts may be passed through rollers to remove the flux.

The plurality of titanium parts, or titanium and other high melting parts which constitute the composite structure, are then assembled in a fixture or are "tacked" or otherwise held in assembled position by any suitable method such as, for example, spot welding or other welding methods, crimping, staking, clamping, etc. The assembled parts, either with or without preheating, are thereafter brazed together by again successively immersing them in a fused salt bath and a bath of molten aluminum or aluminum-base alloy. If desired, other salt and aluminum baths may be employed rather than the baths initially used for the coating step in the process. In many instances it may be expedient to preheat the assembly in the salt bath before dipping it into the aluminum. Although it is preferred in this second salt bath immersion that the salt flux again be floating on the surface of an aluminum or aluminum-base alloy and that the assembly be merely submerged below the fused salt layer, separate salt and aluminum baths may be used, as in the original coating operation, instead of the two-layer bath if desired. Also, as in the previous instance, the salt flux should be activated by aluminum in contact with it. The assembly preferably is at or above the temperature of the aluminum or aluminum-base alloy when it is immersed therein. The time of immersion of the aluminum or aluminum-base alloy may vary from two or three seconds to several minutes, depending upon such factors as the degree of complication of the recesses and the particular assembly being processed. In general, the operating conditions may be substantially the same in this second dipping operation as they were in the initial immersion of the parts in the salt flux and aluminum.

Among the salt fluxes which can be used for this brazing step is the salt composition hereinbefore described in which the titanium base alloy is initially immersed. Various commercially available brazing fluxes which also provide satisfactory results include a salt comprising, by weight, 35% to 55% potassium chloride, 10% to 18% lithium chloride, 15% to 35% sodium chloride, and 6% to 9% cryolite ($Na_3AlF_6$). Sodium fluoride may also be included in this flux in amounts preferably not in excess of 25%. If sodium fluoride is added, the potassium chloride and the sodium chloride contents are normally proportionately reduced. Satisfactory results are also provided with a brazing salt flux comprising, by weight, 15% to 20% sodium chloride, 20% to 30% potassium chloride, 30% to 47% barium chloride, 8% to 10.5% cryolite, and 2% to 10% aluminum fluoride.

The use of one of the aforementioned lower melting brazing fluxes also permits brazing of the parts by means of an aluminum or aluminum-base alloy in sheet form. The brazing sheet may be inserted between joint faces of the coated parts before assembly, and these parts then securely clamped together. Next the assembly is immersed in the molten brazing salt flux which is maintained at a satisfactory temperature, a flux temperature of approximately 1115° F. being highly satisfactory. The flux penetrates the joint gaps and the aluminum alloy sheet melts, flowing across the surfaces to be joined, filling the joints and filleting at the edge of joint locations. It is not necessary to remelt the aluminum coating on the assembled parts during this brazing operation.

After the assembled parts have been removed from the brazing bath, they are permitted to cool in air while clamped in the fixture or otherwise suitably held together. The bonded and coated assembly thus produced has sound and adequately filleted joints. If a fixture is employed, it is preferably removed from the brazed assembly at room temperature.

While the procedure described in detail above constitutes a preferred embodiment of processing in accordance with our invention, it is possible to obtain a satisfactory composite article by departing from the conditions of the preferred embodiment. For example, after the components of the assembly have been coated with aluminum, it is possible to braze in the salt bath directly without the second aluminum dip if the original aluminum coating is thick enough to supply the required filler material for the joint.

In particular applications, the initial aluminum coating operation may be omitted, but only in those instances where capillarity is not the controlling factor in getting the coating metal into contact with the surfaces to be joined. If the gap between these surfaces is sufficiently large, at least in some areas, or if the parts to be joined abut substantially only by means of line or point contact, the aluminum may flow quite readily into the gap, and the low wettability of the titanium part or parts will not prevent the formation of an effective joint. In these instances, of course, a thicker joint is obtained. Generally, however, superior results are obtained if the parts to be joined are first coated with aluminum in the above-described manner.

It is also possible to obtain satisfactory results by heating the titanium-base alloy parts in the original activated fused salt bath maintained at a temperature below that of the molten aluminum or aluminum-base alloy and, while the salt coating on the titanium-base metal parts is still molten, immersing the parts and salt coating in the coating metal bath and heating the same to a temperature within the range between approximately 1250° F. and 1600° F. Likewise, the titanium-base alloy parts may be heated in the molten salt bath until they reach a temperature above the melting point of the aluminum coating metal, and then these parts and the coating of the salt thereon may be allowed to cool to some temperature below the melting point of the aluminum or salt before immersion in the aluminum or aluminum-base alloy coating bath. This procedure is satisfactory so long as the salt coating, if allowed to solidify on the titanium-base alloy parts, is not cracked or broken prior to immersion in the molten aluminum or aluminum-base alloy coating bath and so long as the titanium-base alloy parts are permitted to remain in this coating bath for a time and at a temperature sufficient to reheat the surfaces of these parts and the salt coating to a temperature above the melting point of the aluminum coating metal and preferably to at least 1250° F.

An adherent coating also may be obtained if the titanium alloy parts are retained in the salt until they reach the melting point of the salt rather than the temperature of the salt bath. That is, if it is desired to do so, these parts may be held in the salt for a period of time sufficient to permit the salt to become molten on their surfaces after the initial solidification of the salt layer thereon.

These latter alternative procedures, however, are normally not as desirable as the preferred one hereinbefore described inasmuch as they afford a greater opportunity for oxides to form on the surfaces of the titanium parts. Moreover, the preferred procedure eliminates the tendency to build up an uneven salt layer which is thicker on large sections and thinner on small sections of the titanium-base alloy parts. Although these alternative procedures reduce the length of time it is necessary to hold the titanium-base alloy parts in the molten aluminum, as compared with the preferred process hereinbefore described, they afford no additional advantages over the preferred procedure and require longer holding periods in the salt bath and a deeper layer of the molten salt flux. Hence, it is usually preferable to immerse the titanium or titanium-base alloy parts in the molten aluminum bath immediately after they have contacted the fused salt bath and before the latter has remelted on the titanium alloy parts or assembly.

The titanium or titanium-base alloy parts may be preheated, if desired, prior to assembly and the initial immersion in the fused salt bath, since this treatment permits the use of smaller quantities of salt and smaller size salt bath heating means than are necessary where the titanium alloy parts are heated in the molten salt. If the preheating step is employed, it is preferable to heat the metal parts to be coated and joined under such conditions that the surfaces of the titanium are not oxidized. An inert or reducing atmosphere furnace, such as one employing hydrogen, Drycolene, etc., may be used for this purpose. The term "Drycolene" is the trade name for a furnace atmosphere gas produced in a charcoal generator utilizing a hydrocarbon gas and air as a gas source. The air and hydrogen gas are passed through hot charcoal at approximately 1800° F. and transformed by chemical reaction with the charcoal to an atmosphere consisting of approximately 20% carbon monoxide, less than 2% hydrogen, less than 0.5% carbon dioxide and the balance nitrogen. The preheating temperature is preferably within the range of approximately 1200° F. to 1600° F.

When the titanium or titanium-base alloy parts are preheated, either before or after assembly, in a nonoxidizing atmosphere to the temperature of the fused salt bath and are free of oxides of titanium and other foreign matter, the time of subsequent immersion in the salt bath in each instance, as in the first-mentioned preferred procedure, may be as little as a few seconds if the parts are free of complicated recesses. More complicated shapes may require a longer time in order to insure that the salt thoroughly covers or coats the titanium-base alloy parts at those portions thereof to which the aluminum or aluminum-base alloy is to be bonded. Where the titanium or titanium-base alloy parts have oxides of titanium or other foreign matter on their surfaces, longer periods of immersion in the salt bath will be required in order to provide clean surfaces. Of course, where the preheating step is not employed, sufficient time is required for either the fused salt or the aluminum bath to heat the titanium-base alloy parts to a temperature at least as high as, and preferably somewhat above, the melting point of the aluminum bath material. The exact time will, of course, depend on the dimension of the titanium alloy parts and the size and thermal efficiency of the salt bath. Retaining the titanium-base alloy parts in the fused salt for extended periods of time has no detrimental effects on the resultant product.

The time of immersion in the molten aluminum or aluminum-base alloy bath, either during coating or brazing, may vary from as little as one or two seconds up to several minutes, depending on which of the above procedures is selected and on the degree of complication of recesses, etc., in the parts being processed. However, inasmuch as titanium and titanium-base alloys are generally not readily soluble in aluminum and aluminum-base alloys and do not form a low melting eutectic at the titanium and aluminum interface, they may be safely retained in the molten aluminum for considerable periods of time, if it is found convenient to do so.

As hereinbefore indicated, separate containers and heating means may be employed for the salt baths and the coating and brazing metal baths, but in all instances the fused salt bath should be activated by aluminum in or in contact with it in order to provide effective fluxing action. Where the fused salt is on top of the molten aluminum or aluminum-base alloy, as described above, the proper activity of the molten salt is automatically obtained. On the other hand, where a separate bath and a separate aluminum or aluminum-base alloy coating bath are employed, it is essential to activate the fused salt by other means in the manner hereinbefore explained. In general, however, it is preferable to have both the fused salt and the molten aluminum coating metal in a single furnace and, after fluxing in the molten salt bath, to immerse the titanium-base alloy in the aluminum coating metal beneath the molten salt without transfer through air to a separate pot of molten aluminum. Such a procedure greatly reduces the possibility of having oxides formed on the surfaces of the titanium alloy parts.

As a specific example indicating the quality of the bond produced by the above-described process, brazed joints were formed between a pair of 1.75" x 0.50" x 0.055" strips of commercial titanium. The ends of these pieces were placed together to form a lap of ½ inch, and inasmuch as the strips were ½-inch wide, the area of contact was ¼ square inch. Shear tests on such ¼-square inch lap samples indicated that they do not fail until approximately 1575 pounds' force is applied. The results results of testing other strips in tension so that the joints were in shear showed that ¼-square inch and ⅜-square inch lap samples required more than 1900 pounds to break them in shear. Still other sample strips of brazed titanium having joint area dimensions of 0.50" x 0.055" were tested and broke under tension loads between 2100 pounds and 2500 pounds. All of these tests demonstrated that the formed brazed joints possess sufficient strength to deform the titanium-base material before failure of the joints occurs.

While the invention described herein has been described by means of certain specific examples, it will be understood that various changes and modifications of the embodiments of this invention may be made by those skilled in the art without departing from the principles and scope of our invention as set forth in the following claims.

We claim:

1. A method of forming a composite metal product which comprises assembling a titanium base metal article and a steel article into a desired structure wherein surfaces of said articles are in contact, passing the assembly thus formed into and out of a molten bath of a coating metal selected from the class consisting of aluminum and aluminum base alloys through a molten salt layer capable of absorbing titanium and aluminum oxides floating on said molten coating metal bath, said assembly being passed through said salt layer into said coating metal bath sufficiently quickly so that salt which solidifies on surfaces of said assembly does not remelt until immersed in said coating metal bath, said molten salt layer being at a temperature in excess of 1250° F. while said assembly is passing therethrough, said assembly being retained in said coating metal bath until the contacting surfaces of said assembly reach at least the melting point of said coating metal, and thereafter permitting said assembly to cool into a strongly bonded and coated composite metal product.

2. A method of bonding titanium surfaces together which comprises placing said titanium surfaces into assembled position wherein said surfaces are in contact, immersing the assembled article thus formed in a fused salt containing substantial amounts of alkali metal chlorides and capable of absorbing titanium and aluminum oxides, said fused salt being at a temperature of approximately 1250° F. to 1600° F. and floating on top of a molten bath of a coating metal containing at least 80% aluminum, said article being retained in said fused salt for an insufficient period of time to raise the temperature of said article to the temperature of said salt, thereafter lowering said article into said molten coating metal bath, retaining said article in said coating metal bath until surfaces of said article reach a temperature of at least the melting point of said coating metal, subsequently removing the coated article from said coating metal bath through said fused salt, and thereafter permitting said coated article to cool whereby said surfaces are strongly bonded together.

3. A method of forming a composite metal product which comprises assembling a titanium base metal part and another high melting point metal part into a desired position of abutment, passing the assembly so formed into and out of a molten salt bath capable of absorbing titanium and aluminum oxides, said assembly being removed from said molten salt bath sufficiently quickly so that salt which solidifies on surfaces of said assembly does not remelt while in said salt bath, said molten salt bath being at a temperature in excess of 1250° F. while said assembly is in said bath, immersing said assembly in a molten coating metal selected from the group consisting of aluminum and aluminum base alloys, said assembly being retained in said molten coating metal until the abutting surfaces of said assembled parts reach at least the melting point of said coating metal, and thereafter removing the brazed and joined assembly from said coating metal.

4. A method of forming an oxidation-resistant, brazed and coated metal assembly, said method comprising assembling a metal part containing at least 50% titanium and another high melting point metal part into a desired structure wherein surfaces of said parts are in contact, immersing the formed assembly in a fused salt containing substantial amounts of alkali metal chlorides and capable of absorbing titanium and aluminum oxides, said fused salt being at a temperature of approximately 1250° F. to 1600° F. and floating on top of a molten bath of a coating metal containing at least 80% aluminum which activates said salt, said assembly being retained in said fused salt for an insufficient period of time to raise the temperature of said assembly to the temperature of said salt, thereafter lowering said assembly into said molten coating metal bath, retaining said assembly in said coating metal bath until surfaces of said assembly reach a temperature of at least the melting point of said coating metal, and subsequently removing the coated assembly from said coating metal bath through said fused salt, thereby forming when cool a strongly bonded and coated composite metal product.

References Cited in the file of this patent
UNITED STATES PATENTS

| | | |
|---|---|---|
| 2,321,071 | Ehrhardt | June 8, 1943 |
| 2,524,270 | Pelfrey | Oct. 3, 1950 |
| 2,544,671 | Grange | Mar. 13, 1951 |
| 2,602,413 | Miller | July 8, 1952 |
| 2,686,354 | Lundin | Aug. 17, 1954 |
| 2,690,409 | Wainer | Sept. 28, 1954 |
| 2,992,135 | Finlay | July 11, 1961 |
| 3,010,198 | Hanink et al. | Nov. 28, 1961 |